UNITED STATES PATENT OFFICE.

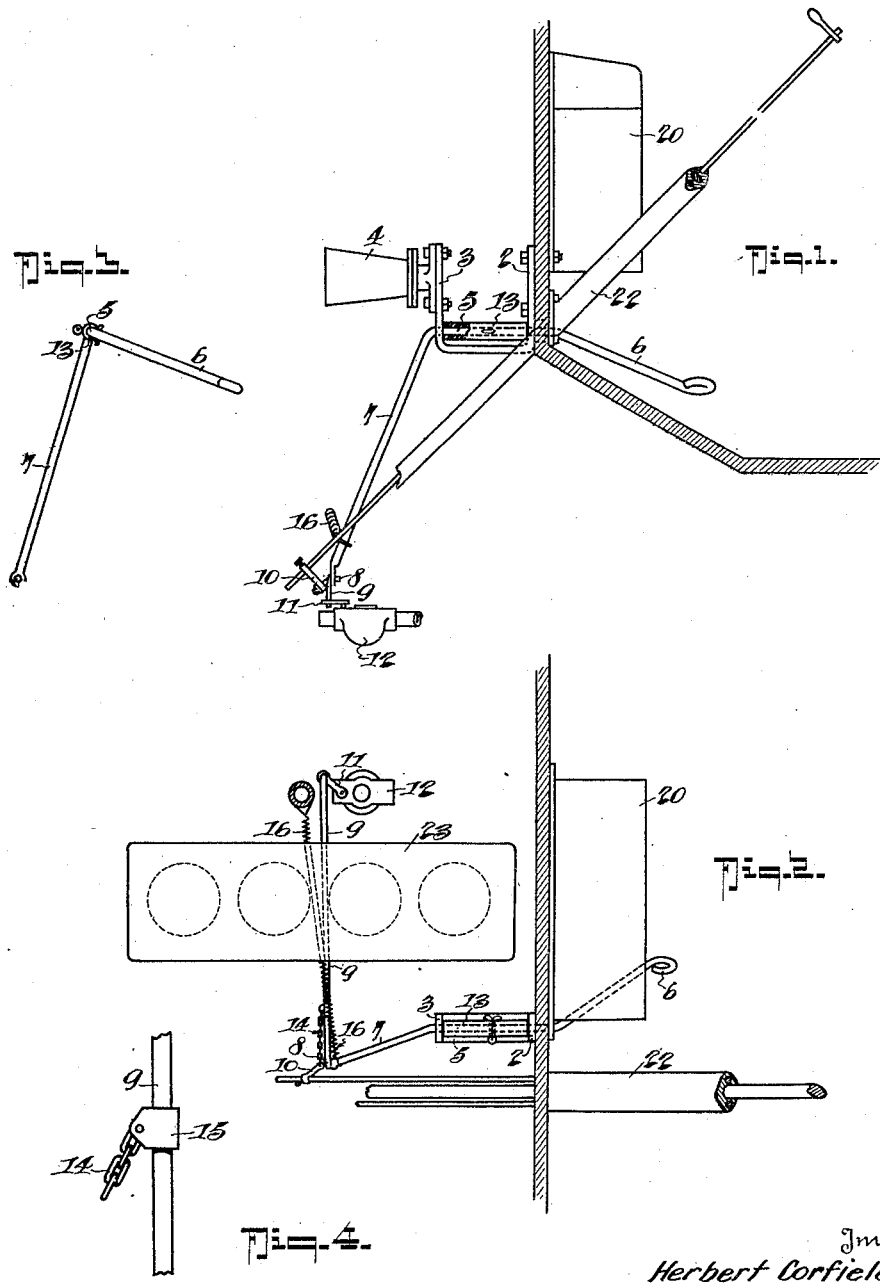

HERBERT CORFIELD, OF DUNCAN, BRITISH COLUMBIA, CANADA.

ACCELERATOR CONNECTION.

1,373,600.  Specification of Letters Patent.  Patented Apr. 5, 1921.

Application filed December 30, 1919. Serial No. 348,366.

*To all whom it may concern:*

Be it known that I, HERBERT CORFIELD, a citizen of the Dominion of Canada, residing at Duncan, British Columbia, Canada, have invented certain new and useful Improvements in Accelerator Connections, of which the following is a specification.

This invention relates to an accelerator connection to the carbureter, which connection has been particularly designed for Ford cars or the like having a left hand control, and attains the desired results in a simple and effective manner.

The invention is particularly set forth in the following specification, reference being made to the drawings by which it is accompanied, in which:

Figure 1 is a side elevation of the device as applied to a car.

Fig. 2, a plan of the same.

Fig. 3, an elevation of the cranked pedal lever, and

Fig. 4, an enlarged detail of the adjustable chain-connection between the throttle control lever and the control rod.

In these drawings 20 represents the coil box in its position on the dash board, 23 the engine and 22 the standard of the steering wheel.

The device comprises a U-shaped bracket, one vertical member 2 of which is secured to the dash board to project the bracket within the engine space under the bonnet. It is secured to the dash board by the bottom left hand bolt of the coil box and the right hand bolt which secures the horn. On the outer vertical member 3 of this bracket the horn 4 is secured and through the lower part of each member 2 and 3 of the bracket is mounted the medial portion 5 of a rod, the after end 6 of which is bent inward toward the medial line of the car and is formed to serve as a pedal. The forward end 7 of this rod is turned angularly downward to take the adjacent bent end 8 of the existing control rod 9 which extends between the hand throttle lever 10 on the left hand side of the car and the lever 11 of the carbureter 12 on the right hand side, the end 7 being axially twisted slightly to bring it normal to the plane of movement of the end.

To retain this cranked rod 5, 6, 7 against endwise movement in the bracket 2, 3 a tubular sleeve 13 is secured on the rod between the members 2 and 3 of the bracket by a split pin or other suitable means.

The end of the hand throttle lever 10 is connected to the carbureter control rod 9 by a short length of chain 14 adjustably secured on the control rod by a clamp 15. A spring 16 is connected between the control lever and any convenient part that will return the control lever and its connected parts to the normal or closed position.

With this arrangement a pedal or accelerator control of the carbureter is provided supplementing the hand control, and the same is accomplished in a simple and effective manner with a minimum number of added parts, that can be readily connected to the existing control without any material changes in such, and without the necessity of cutting the dash board or floor boards of the vehicle.

I am aware that other devices have been patented to provide a car of this class with an accelerator connection, but in all such with which I am acquainted, the axis of the pedal crank movement has been transverse of the medial line of the car, that is, parallel to the dash board, and the movement of the lever end by which connection is made to the control rod has therefore been across the axis and line of movement of the control rod, necessitating a supplementary bell crank or other device to connect the two movements.

By turning as I have done the axis of movement of the pedal crank to be parallel to the medial line of the car or normal, instead of parallel to the dash board, a much more satisfactory connection can be made to the control rod and with fewer parts.

Having now particularly described my invention, I hereby declare that what I claim as new and desire to be protected in by Letters Patent, is:

1. An accelerator connection, comprising in combination a crank rod rockably mounted on the dash board to turn on an axis substantially parallel to the medial line of the car, one end of which rod is bent to form a pedal, and the other end turned down for direct connection to it of the carbureter control rod, means for flexibly connecting the throttle control lever to the same control rod, and means for normally holding the control rod in the closed position.

2. An accelerator connection, comprising in combination a bracket secured to the dash board to project forward therefrom, a crank rod rockably mounted in the bracket to turn on an axis substantially parallel to the medial line of the vehicle, one end of which rod is bent to form a pedal and the other end turned downward and connected to the carbureter control rod, means for flexibly and adjustably connecting the hand throttle lever to the control rod, and a spring holding the control rod in the closed position.

In testimony whereof I affix my signature.

HERBERT CORFIELD.